United States Patent
Nakano et al.

(10) Patent No.: US 11,620,910 B2
(45) Date of Patent: Apr. 4, 2023

(54) INFORMATION PROCESSING APPARATUS, INFORMATION PROCESSING SYSTEM, VEHICLE, INFORMATION PROCESSING METHOD, AND NON-TRANSITORY COMPUTER READABLE MEDIUM

(71) Applicant: TOYOTA JIDOSHA KABUSHIKI KAISHA, Toyota (JP)

(72) Inventors: Keiko Nakano, Kawasaki (JP); Yu Nagata, Nagoya (JP); Takashi Hayashi, Aichi-gun (JP); Ryota Kondo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 363 days.

(21) Appl. No.: 16/938,637

(22) Filed: Jul. 24, 2020

(65) Prior Publication Data
US 2021/0027633 A1    Jan. 28, 2021

(30) Foreign Application Priority Data
Jul. 24, 2019    (JP) .............................. JP2019-136435

(51) Int. Cl.
| | | |
|---|---|---|
| *G06G 7/70* | (2006.01) | |
| *G08G 1/00* | (2006.01) | |
| *G06Q 10/0631* | (2023.01) | |
| *B60P 3/22* | (2006.01) | |

(52) U.S. Cl.
CPC .............. *G08G 1/202* (2013.01); *B60P 3/228* (2013.01); *G06Q 10/06316* (2013.01)

(58) Field of Classification Search
CPC .... G08G 1/202; B60P 3/228; G06Q 10/06316
See application file for complete search history.

(56) References Cited

U.S. PATENT DOCUMENTS

| | | | |
|---|---|---|---|
| 2001/0051083 A1 | 12/2001 | Fujiwara | |
| 2017/0138539 A1* | 5/2017 | Aoki | .......................... F17C 5/06 |
| 2022/0186883 A1* | 6/2022 | Pollica | .................. F17C 13/026 |

FOREIGN PATENT DOCUMENTS

| | | |
|---|---|---|
| CN | 108639627 A | 10/2018 |
| JP | H1049547 A | 2/1998 |
| JP | 2001348102 A | 12/2001 |
| JP | 2002-178850 A | 6/2002 |
| JP | 3107159 U | 1/2005 |
| JP | 2007-072784 A | 3/2007 |
| WO | 2011105094 A1 | 9/2011 |

* cited by examiner

*Primary Examiner* — Adam M Alharbi
(74) *Attorney, Agent, or Firm* — Oliff PLC

(57) ABSTRACT

An information processing apparatus, an information processing system, a vehicle, an information processing method and an information processing program which improve the utility of techniques for generating a travel plan for a vehicle are provided. An information processing apparatus includes a controller. The controller acquires first storage information indicating a stored amount of a first storage apparatus of a first vehicle provided with the first storage apparatus for storing drainage water. The controller generates a travel plan for a second vehicle provided with a second storage apparatus for storing the drainage water collected from the first vehicle, based on predetermined information which includes the first storage information.

16 Claims, 7 Drawing Sheets

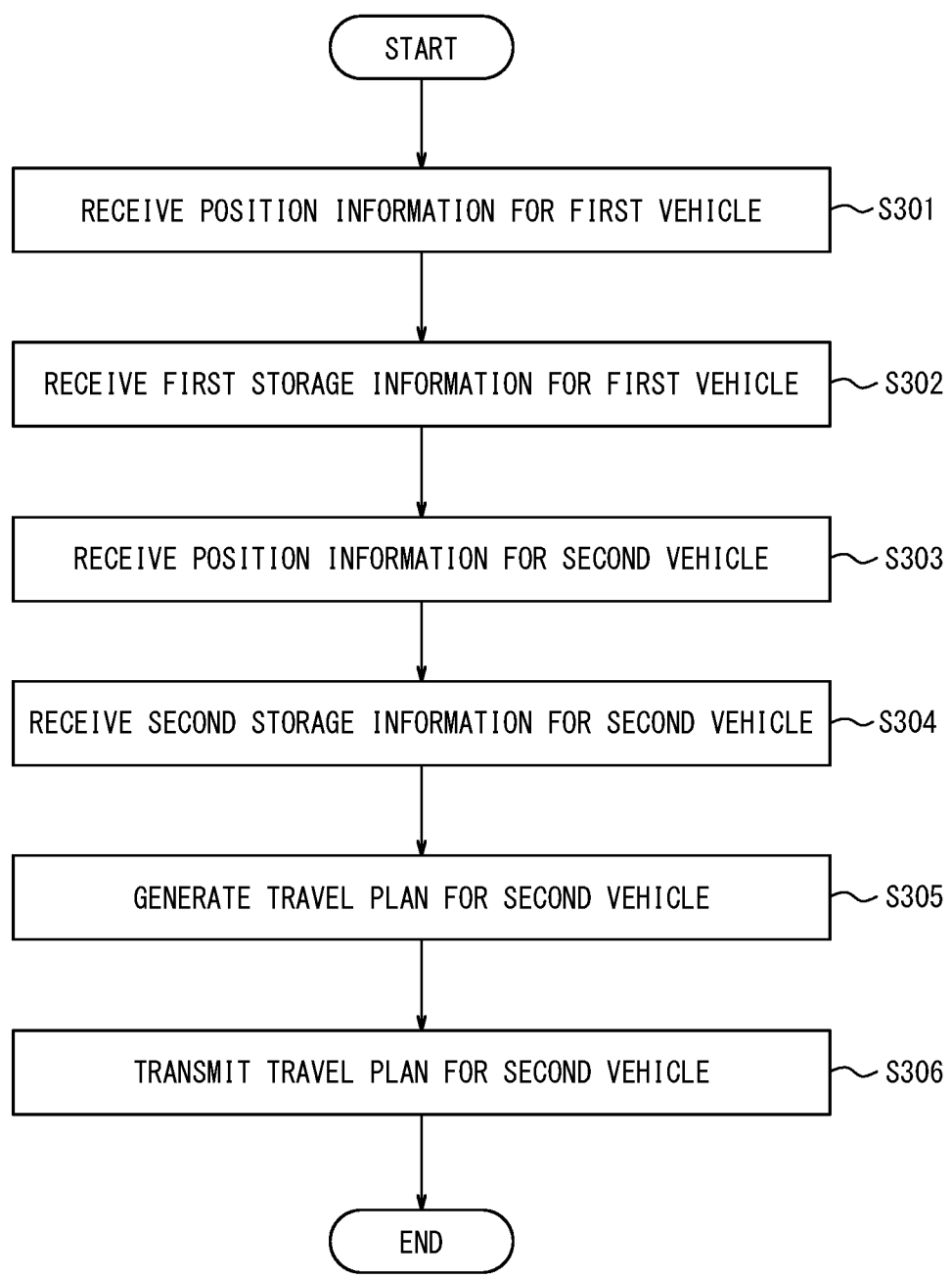

INFORMATION PROCESSING APPARATUS, INFORMATION PROCESSING SYSTEM, VEHICLE, INFORMATION PROCESSING METHOD, AND NON-TRANSITORY COMPUTER READABLE MEDIUM

CROSS-REFERENCE TO RELATED APPLICATION

The present application claims priority to Japanese Patent Application No. 2019-136435 filed on Jul. 24, 2019, the entire disclosure of which is incorporated herein by reference.

TECHNICAL FIELD

The present disclosure relates to an information processing apparatus, an information processing system, a vehicle, an information processing method, and an information processing program.

BACKGROUND

Conventionally, techniques for generating a travel plan for a vehicle in accordance with demand for vehicle dispatch are known. For example, JP 2007-072784 A (PTL 1) discloses a vehicle dispatch system which predicts demand for vehicle dispatch on the basis of event information for events, or the like, and generates a travel plan for a vehicle such as a taxi.

CITATION LIST

Patent Literature

PTL 1: JP 2007-072784 A

SUMMARY

However, in conventional techniques for generating a travel plan for a vehicle, there is room for further improvement to address diversification of vehicles to be dispatched to users and the purposes for dispatch. For example, it is desired to be able to generate travel plans for vehicles which collect a collection target such as drainage water generated at vehicles such as a camper vans and catering vehicles, and improve utility of techniques for generating travel plans for vehicles.

An object of the present disclosure which has been made in view of such circumstances is to provide an information processing apparatus, an information processing system, a vehicle, an information processing method, and an information processing program which improve the utility of techniques for generating travel plans for vehicles.

An information processing apparatus according to one embodiment of the present disclosure includes a controller configured to acquire first storage information indicating a stored amount of a first storage apparatus of a first vehicle provided with the first storage apparatus for storing drainage water, and generate a travel plan for a second vehicle provided with a second storage apparatus for storing the drainage water collected from the first vehicle, based on predetermined information which includes the first storage information.

An information processing method according to one embodiment of the present disclosure is an information processing method to be executed by an information processing apparatus, the information processing method including, acquiring first storage information indicating a stored amount of a first storage apparatus of a first vehicle provided with the first storage apparatus for storing drainage water, and generating a travel plan for a second vehicle provided with a second storage apparatus for storing the drainage water collected from the first vehicle, based on predetermined information which includes the first storage information.

An information processing program according to one embodiment of the present disclosure causes a computer to execute a method comprising acquiring first storage information indicating a stored amount of a first storage apparatus of a first vehicle provided with the first storage apparatus for storing drainage water, and a step of generating a travel plan for a second vehicle provided with a second storage apparatus for storing the drainage water collected from the first vehicle, based on predetermined information which includes the first storage information.

According to the information processing apparatus, the information processing system, the vehicle, the information processing method, and the information processing program according to one embodiment of the present disclosure, utility of a technique of generating a travel plan for a vehicle is improved.

BRIEF DESCRIPTION OF THE DRAWINGS

In the accompanying drawings:

FIG. 7 is a flowchart illustrating processing of the server included in the information processing system.

DETAILED DESCRIPTION

Figure 1:
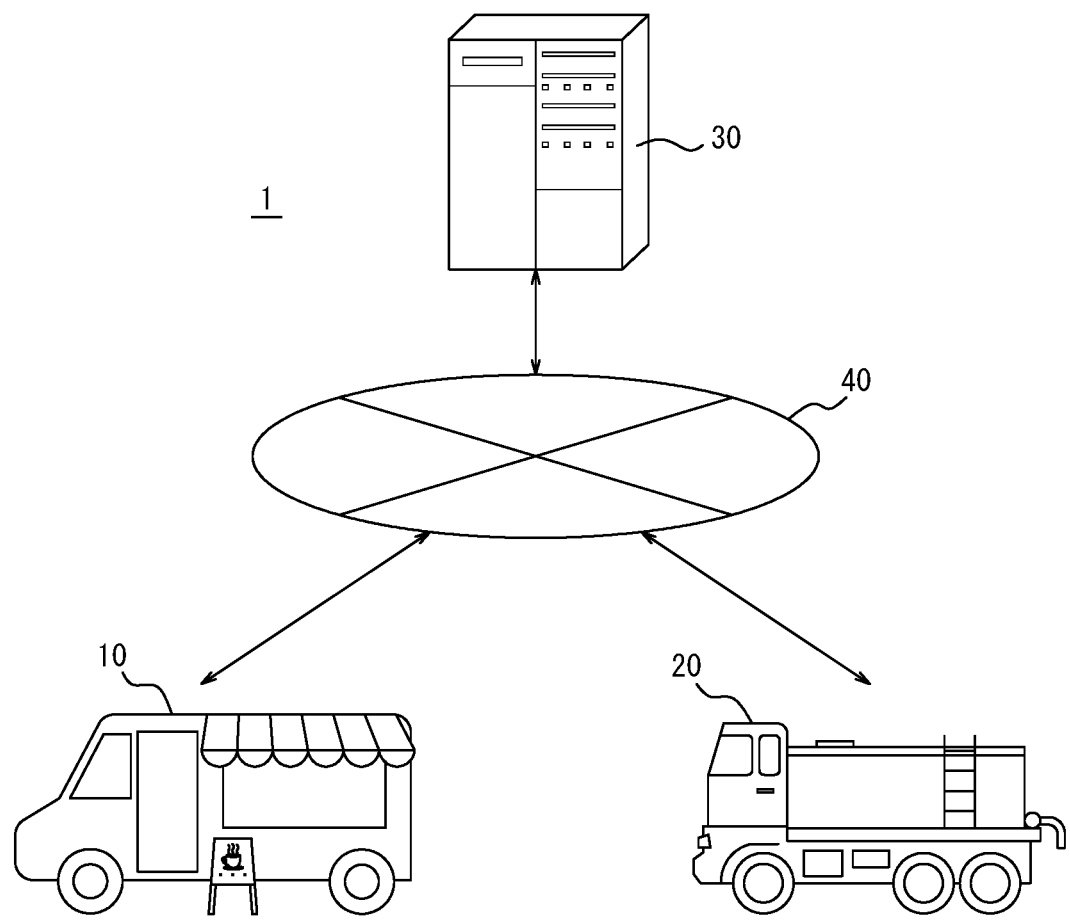
FIG. 1 is a diagram illustrating a schematic configuration of an information processing system according to one embodiment of the present disclosure.

An embodiment of the present disclosure will be described below.

The same reference numerals are assigned to the same or corresponding parts in the respective drawings. In the description of the present embodiment, descriptions of the same or corresponding parts will be omitted or simplified as appropriate.

Information Processing System Configuration

Outline of an information processing system 1 according to an embodiment of the present disclosure will be described with reference to FIG. 1. The information processing system 1 includes one of more first vehicles 10, one or more second vehicles 20 and one or more severs 30. In FIG. 1, to simplify the description, one first vehicle 10, one second vehicle 20 and one server 30 are illustrated. However, the information processing system 1 may include any number of first vehicles 10, any number of second vehicles 20 and any number of servers 30.

The first vehicle 10 is a vehicle provided with a storage apparatus which stores a collection target such as drainage water. In the present embodiment, the collection target is an object which becomes a target for collection. In the present embodiment, the collection target is, for example, drainage water. However, the collection target may be recyclable waste, general waste, industrial waste, or the like. The drainage water may include, for example, liquid generated from toilets, baths, cooking, cleaning, or the like, a mixture of liquid and solid, a gel, or the like. The first vehicle 10 may be, for example, a vehicle such as a camper van and a catering vehicle, which includes a facility such as a toilet and a kitchen. The first vehicle 10 may be driven by a driver or driving may be automated at any level in the present embodiment. The level of automation is, for example, one of the levels from level 1 to level 5 as specified by the Society of Automotive Engineers (SAE)

The second vehicle 20 is a vehicle which collects a collection target such as drainage water from the first vehicle 10. The second vehicle 20 may be, for example, a septic tank truck. The second vehicle 20 includes a storage apparatus which stores the collected drainage water. In the present embodiment, the second vehicle 20 may be driven by a driver or driving may be automated at any level. The level of automation is, for example, one of levels from level 1 to level 5 as specified by the SAE.

The server 30 includes one or a plurality of information processing apparatuses which can perform communication with each other. The first vehicle 10, the second vehicle 20 and the server 30 can respectively perform communication with each other via a network 40.

The network 40 is any communication network through which the first vehicle 10, the second vehicle 20 and the server 30 can perform communication with each other. The network 40 may be a wireless or wired transmission path or may be a communication network such as the Internet. For example, the network 40 in the present embodiment may include an ad hoc network, a MAN (Metropolitan Area Network), a cellular network, a WPAN (Wireless Personal Area Network), a PSTN (Public Switched Telephone Network), a terrestrial wireless network, an optical network, other networks or combination thereof. Components of the wireless network may include, for example, an access point (for example, a Wi-Fi access point), a femtocell, or the like.

In the information processing system 1, the server 30 generates a travel plan for the second vehicle 20 to be used by the second vehicle 20 to collect a collection target such as drainage water generated at the first vehicle 10, and transmits the generated travel plan to the second vehicle 20. In the present embodiment, the "travel plan" for the second vehicle 20 is a travel schedule for the second vehicle 20. The travel plan for the second vehicle 20 may include, for example, stop point information indicating a stop point at which the second vehicle 20 is to stop, a travel route which passes through the stop point or which reaches the stop point, a scheduled time of arrival at the stop point, or the like. The second vehicle 20 collects the collection target such as drainage water generated at the first vehicle 10 while travel on the basis of the received travel plan. As such, a user of the first vehicle 10 such as a camper van and a catering vehicle can continuously use a facility such as a toilet and a kitchen without moving the first vehicle 10 from a stop position even in a case in which there is no drainage treatment facility, or the like, which collects drainage water, near the stop position of an event cite, a camp site, or the like.

The first vehicle 10, the second vehicle 20 and the server 30 of the information processing system 1 will be described in detail next.

First Vehicle Configuration

Figure 2:
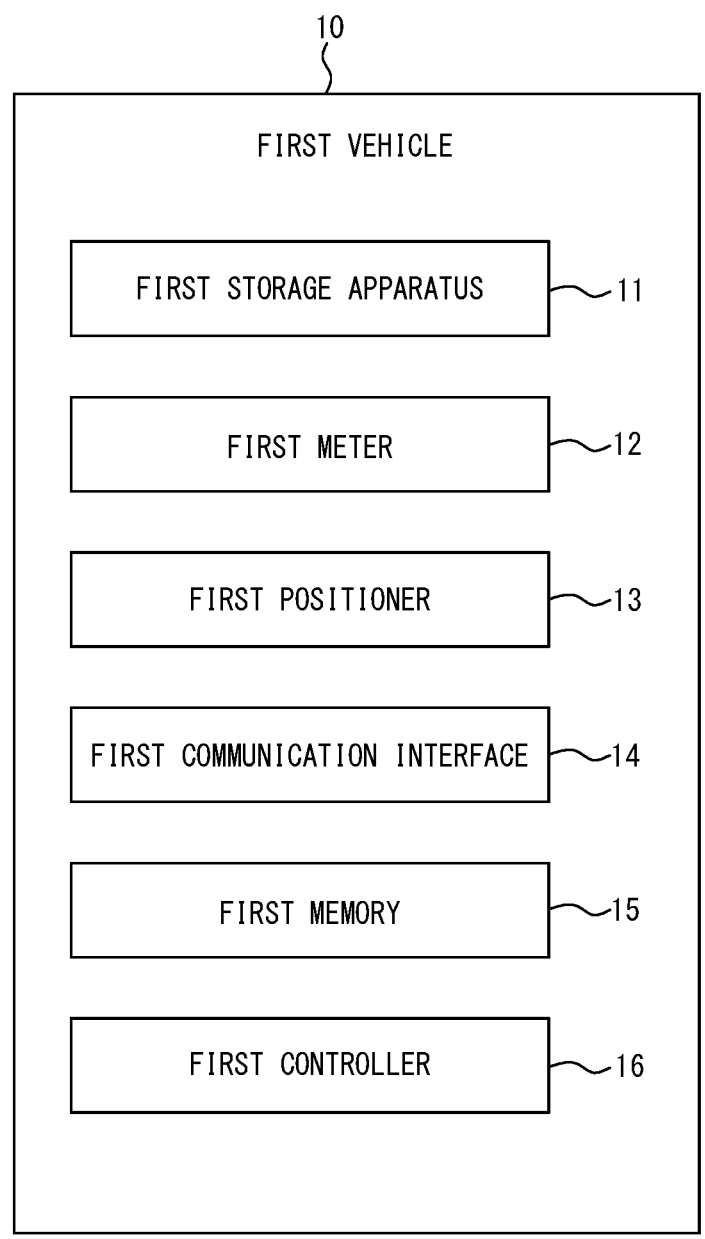
FIG. 2 is a block diagram illustrating a schematic configuration of a first vehicle included in the information processing system.

A configuration of the first vehicle 10 in the information processing system 1 will be described in detail. As illustrated in the block diagram of FIG. 2, the first vehicle 10 includes a first storage apparatus 11, a first meter 12, a first positioner 13, a first communication interface 14, a first memory 15 and a first controller 16. The first storage apparatus 11, the first meter 12, the first positioner 13, the first communication interface 14, the first memory 15 and the first controller 16 may be respectively incorporated into the first vehicle 10 or may be detachably provided to the first vehicle 10. The first storage apparatus 11, the first meter 12, the first positioner 13, the first communication interface 14, the first memory 15 and the first controller 16 are connected so as to be able to perform communication with each other via an in-vehicle network such as, for example, a CAN (Controller Area Network) or a leased line.

The first storage apparatus 11 stores a collection target such as drainage water. The first storage apparatus 11 includes, for example, a tank. However, the first storage apparatus 11 may include any suitable vessel such as a box, a bag and a container, which can accommodate a collection target, as well as a tank. The vessel such as a tank may be detachably provided to the first storage apparatus 11.

The first storage apparatus 11 is connected so as to be able to collect a collection target from an apparatus provided at the first vehicle 10. The apparatus may include, for example, a toilet, a kitchen, a bathtub, or the like. In such a case, the first storage apparatus 11 may include a mechanism such as a hose and a pump for collecting the collection target from the apparatus.

The first meter 12 measures information indicating a stored amount of the first storage apparatus 11. In the present embodiment, the "information indicating the stored amount" of the storage apparatus is information from which it is possible to determine an amount of the collection target stored in the storage apparatus. In the present embodiment, the information indicating the stored amount includes, for example, a volume of the collection target stored in the storage apparatus. However, the information indicating the stored amount of the storage apparatus may include the weight of the collection target, the water level and a proportion of the collection target in the capacity of the storage apparatus, or a change amounts and a change rate thereof, or the like. The first meter 12 includes a level meter, a level switch, or the like. Alternatively, the first meter 12 may include a weighing scale, a flowmeter, or the like. The first meter 12 is attached to or near the first storage apparatus 11. In the following description, the information indicating the stored amount of the first storage apparatus 11 will be also referred to as first storage information.

The first positioner 13 measures position information for the first vehicle 10. In the present embodiment, the "position information" of the vehicle is information from which it is possible to determine a position of the vehicle. In the present embodiment, the position information for the vehicle includes, for example, a coordinate of the vehicle. However, the position information for the vehicle may include speed, a migration path, a moving distance, change amounts and change rates thereof, or the like. The first positioner 13 includes a receiver which supports a satellite positioning system. The satellite positioning system supported by the receiver may be, for example, GPS (Global Positioning System). Alternatively, the first positioner 13 may include an acceleration sensor, a gyro sensor, or the like. For example, a car navigation apparatus may function as the first positioner 13.

The first communication interface 14 includes a communication module to be connected to the network 40. The communication module may be a communication module which supports mobile communication standards such as, for example, 4G (4th Generation) and 5G (5th Generation). For example, in-vehicle communication equipment may function as the first communication interface 14. In the present embodiment, the first vehicle 10 is connected to the network 40 via the first communication interface 14. As such, the first vehicle 10 can perform communication with the server 30, or the like.

The first memory 15 may be, for example, a semiconductor memory, a magnetic memory, an optical memory, or the like. The first memory 15 may function as, for example, a main storage apparatus, an auxiliary storage apparatus or a cache memory. The first memory 15 stores any information to be used for operation of the first vehicle 10. For example, the first memory 15 may store a system program, an application program, built-in software, or the like. The information stored in the first memory 15 may be updated with, for example, information acquired from the network 40 via the first communication interface 14.

The first memory 15 may store, for example, the first storage information indicating the stored amount of the first storage apparatus 11, and the position information for the first vehicle 10 as described above. The first memory 15 may store first vehicle identification information which uniquely identifies the first vehicle 10. The first vehicle identification information will be also referred to as a first vehicle ID (Identifier). In the present embodiment, the first vehicle ID is, for example, information issued by the server 30. However, the first vehicle ID may be a vehicle identification number, an automobile registration number, or the like, of the first vehicle 10. When the first vehicle 10 transmits information to the server 30, or the like, the first vehicle 10 may transmit the first vehicle ID along with the information to indicate that the information is transmitted from the first vehicle.

The first controller 16 includes one or more processors. The first controller 16 may respectively control the above-described first storage apparatus 11, first meter 12, first positioner 13, first communication interface 14 and first memory 15 to realize functions thereof. For example, an ECU (Electronic Control Unit) mounted on the first vehicle 10 may function as the first controller 16. In the present embodiment, the "processor" may be a general-purpose processor, a dedicated processor which is dedicated to particular processing, or the like.

Figure 3:
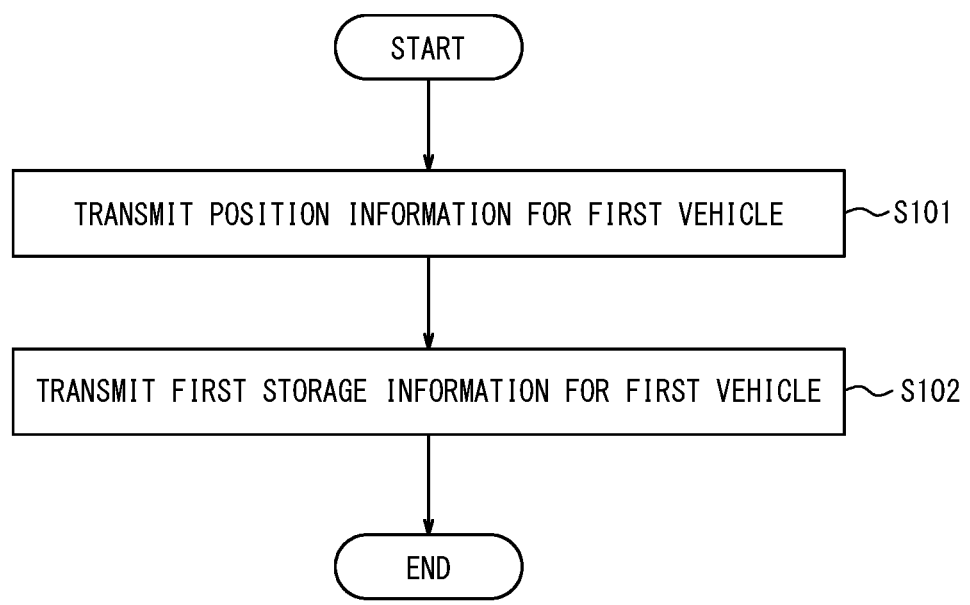
FIG. 3 is a flowchart illustrating processing of the first vehicle included in the information processing system.

Operation of the first vehicle 10 to be realized by each function of the first vehicle 10 being controlled by the first controller 16 will be described with reference to FIG. 3. The operation of the first vehicle 10 corresponds to a control method of the first vehicle 10.

In step S101, the first vehicle 10 transmits the position information for the first vehicle 10.

Specifically, the first controller 16 may transmit the position information for the first vehicle 10 from the first communication interface 14 at a predetermined timing. The first controller 16 may transmit the position information for the first vehicle 10, for example, to the server 30. In the present embodiment, the "predetermined timing" may be, for example, repeated a plurality of times, or may occur only once without being repeated. In a case in which the predetermined timing includes a plurality of timings, the respective timings may be regularly repeated, or may be irregularly repeated.

In step S102, the first vehicle 10 transmits the first storage information indicating the stored amount of the first storage apparatus 11.

Specifically, the first controller 16 may transmit the first storage information indicating the stored amount of the first storage apparatus 11 from the first communication interface 14 at a predetermined timing. The first controller 16 may transmit the first storage information, for example, to the server 30.

Second Vehicle Configuration

Figure 4:
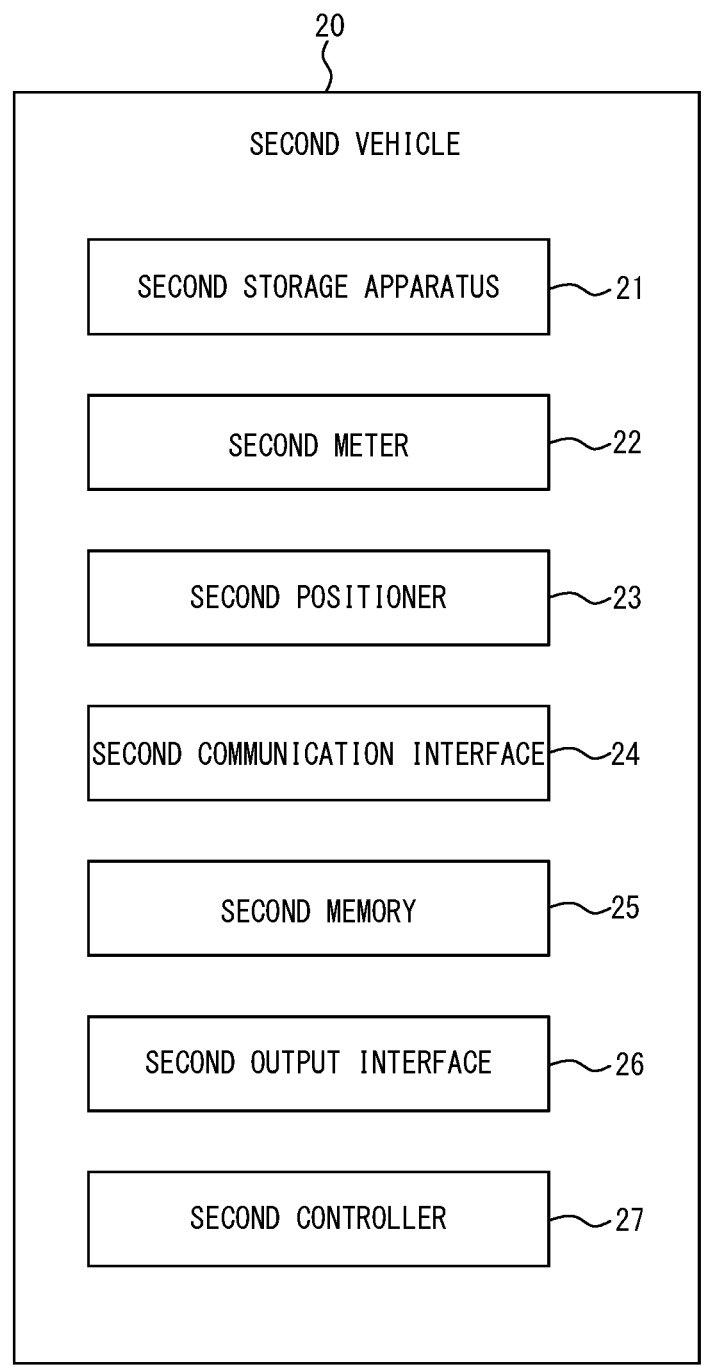
FIG. 4 is a block diagram illustrating a schematic configuration of a second vehicle included in the information processing system.

A configuration of the second vehicle 20 in the information processing system 1 will be described in detail. As illustrated in a block diagram in FIG. 4, the second vehicle 20 includes a second storage apparatus 21, a second meter 22, a second positioner 23, a second communication interface 24, a second memory 25, a second output interface 26 and a second controller 27. The second storage apparatus 21, the second meter 22, the second positioner 23, the second communication interface 24, the second memory 25, the second output interface 26 and the second controller 27 may be respectively incorporated into the second vehicle 20 or may be detachably provided to the second vehicle 20. The second storage apparatus 21, the second meter 22, the second positioner 23, the second communication interface 24, the second memory 25, the second output interface 26 and the second controller 27 are connected so as to be able to perform communication with each other via, for example, an in-vehicle network such as a CAN or a leased line.

The second storage apparatus 21 stores the collection target collected from the first vehicle 10. The second storage apparatus 21 includes, for example, a tank. However, the second storage apparatus 21 may include any suitable vessel such as a box, a bag and a container, which can accommodate the collection target, as well as a tank. The vessel such as a tank may be detachably provided to the second storage apparatus 21. In a case in which the vessel is detachable, the vessel provided to the second storage apparatus 21 may be compatible with the vessel provided to the first storage apparatus 11 of the first vehicle 10. As such, the second storage apparatus 21 can collect the collection target from the first vehicle 10 by manually or automatically exchanging the vessel which stores the collection target, provided to the first storage apparatus 11 of the first vehicle 10, with an empty vessel of the second storage apparatus 21.

The second storage apparatus 21 may include a mechanism for collecting a collection target from the first storage apparatus 11 of the first vehicle 10. For example, the second storage apparatus 21 may include a hose, a pump, or the like, for collecting the collection target by connecting to an opening of the first storage apparatus 11 of the first vehicle 10.

The second meter 22 measures information indicating a stored amount of the second storage apparatus 21. The second meter 22 includes a level meter, a level switch, or the like. Alternatively, the second meter 22 may include a weighing scale, a flowmeter, or the like. The second meter 22 is attached to or near the second storage apparatus 21. In the following description, the information indicating the stored amount of the second storage apparatus 21 will be also referred to as second storage information.

The second positioner 23 measures position information for the second vehicle 20. The second positioner 23 includes a receiver which supports a satellite positioning system. The satellite positioning system supported by the receiver may be, for example, GPS. Alternatively, the second positioner 23 may include an acceleration sensor, a gyro sensor, or the like. For example, a car navigation apparatus may function as the second positioner 23.

The second communication interface 24 includes a communication module to be connected to the network 40. The communication module may be a communication module which supports mobile communication standards such as, for example, 4G and 5G. For example, in-vehicle communication equipment may function as the second communication interface 24. In the present embodiment, the second vehicle 20 is connected to the network 40 via the second communication interface 24. As such, the second vehicle 20 can perform communication with the server 30, or the like.

The second memory 25 may be, for example, a semiconductor memory, a magnetic memory, an optical memory, or the like. The second memory 25 may function as, for example, a main storage apparatus, an auxiliary storage apparatus or a cache memory. The second memory 25 stores any information to be used for operation of the second vehicle 20. For example, the second memory 25 may store a system program, an application program, built-in software, or the like. The information stored in the second memory 25 may be able to be updated with, for example, information acquired from the network 40 via the second communication interface 24.

The second memory 25 may store, for example, the second storage information indicating the stored amount of the second storage apparatus 21 and the position information for the second vehicle 20 described above. The second memory 25 may store a travel plan for the second vehicle 20 which will be described in detail later. The second memory 25 may store second vehicle identification information which uniquely identifies the second vehicle 20. The second vehicle identification information will also be referred to as a second vehicle ID. In the present embodiment, the second vehicle ID is, for example, information issued from the server 30. However, the second vehicle ID may be a vehicle identification number, automobile registration number, or the like, of the second vehicle 20. When the second vehicle 20 transmits information to the server 30, or the like, the second vehicle 20 may transmit the second vehicle ID along with the information to indicate that the information is transmitted from the second vehicle.

The second output interface 26 outputs information using images, sounds, or the like. The second output interface 26 may be any suitable output apparatus such as, for example, a display or a speaker. The second output interface 26 outputs, for example, information included in the travel plan for the second vehicle 20.

The second controller 27 includes one or more processors. The second controller 27 may respectively control the above-described second storage apparatus 21, second meter 22, second positioner 23, second communication interface 24, second memory 25 and second output interface 26 to realize functions thereof. For example, an ECU mounted on the second vehicle 20 may function as the second controller 27.

Figure 5:
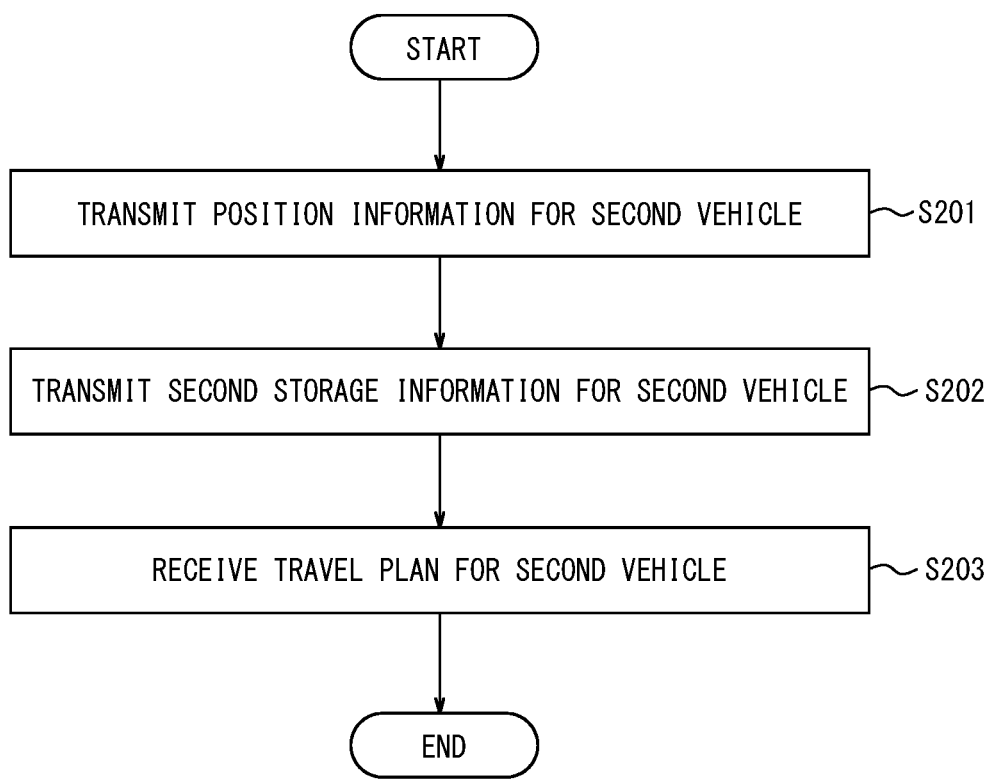
FIG. 5 is a flowchart illustrating processing of the second vehicle included in the information processing system.

Operation of the second vehicle 20 to be realized by each function of the second vehicle 20 being controlled by the second controller 27 will be described with reference to FIG. 5. The operation of the second vehicle 20 corresponds to a control method of the second vehicle 20.

In step S201, the second vehicle 20 transmits the position information for the second vehicle 20.

Specifically, the second controller 27 may transmit the position information for the second vehicle 20 from the second communication interface 24 at a predetermined timing. The second controller 27 may transmit the position information for the second vehicle 20, for example, to the server 30.

In step S202, the second vehicle 20 transmits the second storage information indicating the stored amount of the second storage apparatus 21.

Specifically, the second controller 27 may transmit the second storage information indicating the stored amount of the second storage apparatus 21 from the second communication interface 24 at a predetermined timing. The second controller 27 may transmit the second storage information, for example, to the server 30.

In step S203, the second vehicle 20 receives the travel plan for the second vehicle 20 from the server 30.

Specifically, the second controller 27 may receive the travel plan for the second vehicle 20 from the server 30 via the second communication interface 24. The second controller 27 may cause the received travel plan for the second vehicle 20 to be stored in the second memory 25. The second controller 27 may, for example, cause information included in the travel plan for the second vehicle 20 to be displayed on the second output interface 26. The second controller 27 may perform traveling by automated driving or support driving by a driver on the basis of the travel plan for the second vehicle 20.

Server Configuration

Figure 6:
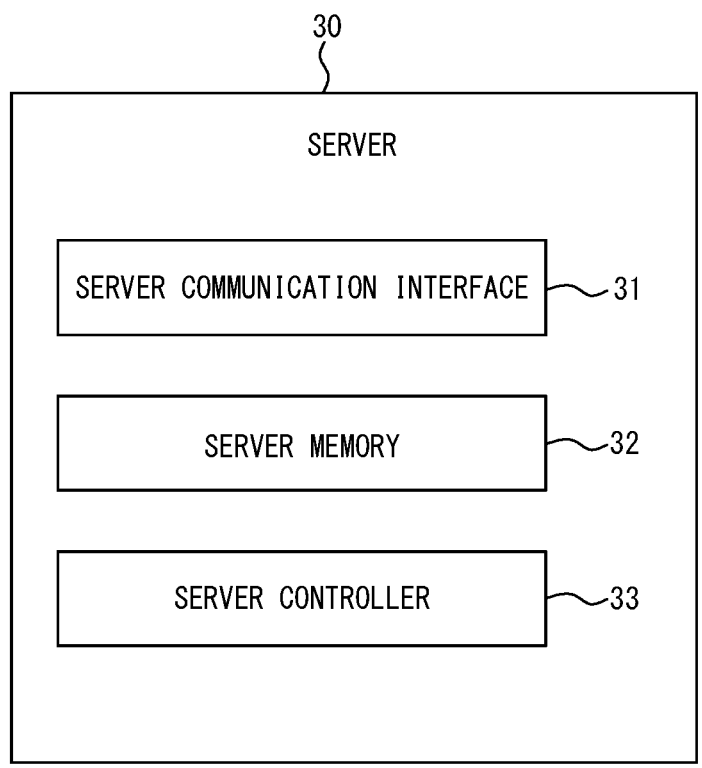
FIG. 6 is a block diagram illustrating a schematic configuration of a server included in the information processing system.

As illustrated in the block diagram of FIG. 6, the server 30 includes a server communication interface 31, a server memory 32 and a server controller 33. The server communication interface 31, the server memory 32 and the server controller 33 are connected in a wired or wireless manner so as to be able to perform communication.

The server communication interface 31 includes a communication module to be connected to the network 40. The communication module may be a communication module which supports standards such as, for example, a wired LAN (Local Area Network) and a wireless LAN. In the present embodiment, the server 30 is connected to the network 40 via the server communication interface 31. As such, the server 30 can perform communication with the first vehicle 10 and the second vehicle 20. In the present embodiment, the server communication interface 31 is an example of an acquisition interface. Reception of information at the server communication interface 31 is an example of acquisition of information by the acquisition interface.

The server memory 32 may be, for example, a semiconductor memory, a magnetic memory, an optical memory, or the like. The server memory 32 may function as, for example, a main storage apparatus, an auxiliary storage apparatus or a cache memory. The server memory 32 stores any information to be used for operation of the server 30. For example, the server memory 32 may store a system program, an application program, a database, or the like. The information stored in the server memory 32 may be updated with, for example, information acquired from the network 40 via the server communication interface 31.

The server memory 32 may store, for example, the first vehicle ID which uniquely identifies the first vehicle 10, and the second vehicle ID which uniquely identifies the second vehicle 20, described above. The server memory 32 may store information regarding the first vehicle 10 including the vehicle type and use application for the first vehicle 10, a capacity of the first storage apparatus 11, the type of the collection target to be stored in the first storage apparatus 11, or the like, in association with the first vehicle ID of the first vehicle 10. The server memory 32 may store information regarding the second vehicle 20 including the vehicle type of the second vehicle 20, a capacity of the second storage apparatus 21, the type of collection target to be stored in the second storage apparatus 21, or the like, in association with the second vehicle ID of the second vehicle 20.

The server controller 33 includes one or more processors. The server controller 33 may respectively control the above-described server communication interface 31 and server memory 32 to realize functions thereof.

Operation of the server 30 to be realized by each function of the server 30 being controlled by the server controller 33 will be described with reference to FIG. 7. The operation of the server 30 corresponds to an information processing method of the server 30.

In step S301, the server 30 acquires the position information for the first vehicle 10.

Specifically, the server controller 33 receives the position information for the first vehicle 10 via the server communication interface 31. The server controller 33 may receive the position information for the first vehicle 10, for example, from the first vehicle 10. The server controller 33 may cause the received position information for the first vehicle 10 to be stored in the server memory 32 in association with the first vehicle ID.

In step S302, the server 30 acquires the first storage information indicating the stored amount of the first storage apparatus 11 of the first vehicle 10.

Specifically, the server controller 33 receives the first storage information indicating the stored amount of the first storage apparatus 11 of the first vehicle 10 via the server communication interface 31. The server controller 33 may receive the first storage information, for example, from the first vehicle 10. The server controller 33 may cause the received first storage information to be stored in the server memory 32 in association with the first vehicle ID.

In step S303, the server 30 acquires the position information for the second vehicle 20.

Specifically, the server controller 33 receives the position information for the second vehicle 20 via the server communication interface 31. The server controller 33 may receive the position information for the second vehicle 20, for example, from the second vehicle 20. The server controller 33 may cause the received position information for the second vehicle 20 to be stored in the server memory 32 in association with the second vehicle ID.

In step S304, the server 30 acquires the second storage information indicating the stored amount of the second storage apparatus 21 of the second vehicle 20.

Specifically, the server controller 33 receives the second storage information indicating the stored amount of the second storage apparatus 21 of the second vehicle 20 via the server communication interface 31. The server controller 33 may receive the second storage information, for example, from the second vehicle 20. The server controller 33 may cause the received second storage information to be stored in the server memory 32 in association with the second vehicle ID.

In step S305, the server 30 generates a travel plan for the second vehicle 20 on the basis of predetermined information.

Specifically, the server controller 33 generates the travel plan for the second vehicle 20 on the basis of the predetermined information. The predetermined information is any information to be used for generation of the travel plan for the second vehicle 20. The predetermined information may include at least one of the position information for the first vehicle 10, the first storage information of the first vehicle 10, the position information for the second vehicle 20 and the second storage information of the second vehicle 20 described above. Further, the predetermined information may include information regarding an event where one or more first vehicles 10 will gather, including a location, date and time, the number of customers, or the like, of the event. The server controller 33 may generate the travel plan for the second vehicle 20 at any suitable timing. For example, the server controller 33 may generate the travel plan for the second vehicle 20 in a case in which the predetermined information is updated by reception of information from the first vehicle 10 or the second vehicle 20, or the like.

In generation of the travel plan for the second vehicle 20, the server controller 33 may determine whether or not the stored amount of the first storage apparatus 11 will reach a first limit amount on the basis of the predetermined information. The first limit amount is a limit amount of a collection target which can be stored in the first storage apparatus 11. The first limit amount may be, for example, an amount which can be stored in the first storage apparatus 11, as determined by a manufacturer of the first storage apparatus 11, or the like.

Specifically, the server controller 33 may calculate a predicted value of the stored amount of the first storage apparatus 11 from an actual measurement value of the first storage information using a statistical method. The statistical method may be, for example, a time-series analysis method such as an exponential smoothing method or a moving average method. The predicted value of the stored amount of the first storage apparatus 11 may be time-series information.

The server controller 33 may compare the calculated predicted value of the stored amount of the first storage apparatus 11 with the first limit amount. In a case in which the calculated predicted value of the stored amount of the first storage apparatus 11 becomes equal to or greater than the first limit amount at a certain time point, the server controller 33 may determine that the stored amount of the first storage apparatus 11 reaches the first limit amount at that time point. In a case in which the server controller 33 determines that the stored amount of the first storage apparatus 11 reaches the first limit amount at a first time point, the server controller 33 generates a travel plan for the second vehicle 20 such that the second vehicle reaches the first vehicle 10 by no later than the first time point.

For example, the server controller 33 may generate the travel plan for the second vehicle 20 so as to improve fuel efficiency by reducing traveling speed of the second vehicle 20 in a range where the second vehicle 20 can reach the first vehicle 10 by no later than the first time point at which the stored amount of the first storage apparatus 11 reaches the first limit amount. Alternatively, in a case in which there are a plurality of first vehicles 10, the server controller 33 may generate the travel plan for the second vehicle 20 so that the second vehicle 20 can reach the first vehicles 10 by no later than the first time points of the respective first vehicles 10 by increasing priority as time points at which the stored amounts of the first storage apparatuses 11 reach the first limit amount are earlier.

Meanwhile, in a case in which the server controller 33 determines that the stored amount of the first storage apparatus 11 of the first vehicle 10 does not reach the first limit amount until a second time point, the server controller 33 may generate the travel plan for the second vehicle 20 by lowering the priority of the first vehicle 10. For example, in a case in which the first vehicle 10 is a hired car, the second time point may be a scheduled time for returning the first vehicle 10. Alternatively, in a case in which the first vehicle 10 is a catering vehicle, the second time point may be a closing time for the first vehicle 10. In a case in which the server controller 33 determines that the stored amount of the first storage apparatus 11 of the first vehicle 10 does not reach the first limit amount until the scheduled time for returning or the closing time, the server controller 33 may generate the travel plan for the second vehicle 20 by lowering the priority of the first vehicle 10 by removing the first vehicle 10 from the collection targets, postponing collection from the first vehicle 10 to the next day later, or the like. In a case in which there are a plurality of first vehicles 10, the server controller 33 may generate the travel plan for the second vehicle 20 so that the second vehicle 20 can reach the respective first vehicles 10 by lowering the priority of the first vehicle 10 whose stored amount of the first storage apparatus 11 does not reach the first limit amount until the second time point.

The server controller 33 may determine whether or not the stored amount of the second storage apparatus 21 reaches the second limit amount on the basis of the above-described predetermined information in generation of the travel plan for the second vehicle 20. The second limit amount is a limit amount of a collection target which can be stored in the second storage apparatus 21. The second limit amount may be, for example, an amount which can be stored in the second storage apparatus 21 of the second storage apparatus 21, as determined by a manufacturer, or the like.

Specifically, the server controller 33 may compare the total value of an actual measurement value of the stored amount of the first storage apparatus 11 included in the first storage information and an actual measurement value of the stored amount of the second storage apparatus 21 included in the second storage information, with the second limit amount.

Alternatively, the server controller 33 may calculate a predicted value of the stored amount of the first storage apparatus 11 at a scheduled collection time point from the actual measurement value of the first storage information using a statistical method. The server controller 33 may compare the total value of the calculated predicted value of the stored amount of the first storage apparatus 11 and the actual measurement value of the stored amount of the second storage apparatus 21, with the second limit amount.

In a case in which the above-described total value becomes equal to or greater than the second limit amount, the server controller 33 may determine that the stored amount of the second storage apparatus 21 will reach the second limit amount. In a case in which the server controller 33 determines that the stored amount of the second storage apparatus 21 will reach the second limit amount, the server controller 33 generates a travel plan for the second vehicle which avoids the stored amount of the second storage apparatus 21 from reaching the second limit amount. For example, when the server controller 33 determines that the stored amount of the second storage apparatus 21 will reach the second limit amount, the server controller 33 may generate the travel plan for the second vehicle such that the stored amount of the second storage apparatus 21 will not reach the second limit amount by reducing an amount of the collection target which is to be collected from the first vehicle 10. Alternatively, in a case in which there are a plurality of first vehicles 10, when the server controller 33 determines that the stored amount of the second storage apparatus 21 will reach the second limit amount, the server controller 33 may generate the travel plan for the second vehicle such that the stored amount of the second storage apparatus 21 does not reach the second limit amount by removing the first vehicle 10 with lower priority from the collection targets.

Further, the predetermined information may include information regarding a collection facility which collects the collection target from the second vehicle 20. The information regarding the collection facility may include information such as location information and opening hours of the collection facility. The collection facility may be, for example, a drainage treatment facility which collects drainage water from the second vehicle 20. In such a case, the server controller 33 may generate a travel plan for the second vehicle 20 which passes through the collection facility such as the drainage treatment facility on the basis of the predetermined information.

Specifically, as described above, in a case in which the total value of the predicted value of the stored amount of the first storage apparatus 11 at the scheduled collection time point and the stored amount of the second storage apparatus 21 becomes equal to or greater than the second limit amount, the server controller 33 may determine that the stored amount of the second storage apparatus 21 will reach the second limit amount. In a case in which the server controller 33 determines that the stored amount of the second storage apparatus 21 will reach the second limit amount, the server controller 33 may generate the travel plan for the second vehicle such that the second vehicle reaches the first vehicle 10 after passing through the collection facility in advance to reduce the stored amount of the second storage apparatus 21 at the collection facility.

Alternatively, in a case in which there are a plurality of first vehicles 10, when it is determined that the stored amount of the second storage apparatus 21 will reach the second limit amount, the server controller 33 may generate the travel plan for the second vehicle such that the second vehicle passes through the collection facility during collection from the plurality of first vehicles 10 to reduce the stored amount of the second storage apparatus 21 at the collection facility, and collects the collection targets from all the first vehicles 10.

The server controller 33 may cause the generated travel plan for the second vehicle 20 to be stored in the server memory 32 in association with the second vehicle ID. The travel plan for the second vehicle 20 may include stop point information indicating a stop point at which the second vehicle 20 stops, a traveling route which passes through the stop point or which reaches the stop point, scheduled time of arrival at the stop point, or the like. The stop point information may include information for a stop point for collection of a collection target from the first vehicle 10, and information for a stop point at a collection facility.

In step S306, the server 30 transmits the travel plan for the second vehicle 20.

Specifically, the server controller 33 may transmit the travel plan for the second vehicle 20 from the server communication interface 31 at a predetermined timing. The server controller 33 may transmit the travel plan for the second vehicle 20, for example, to the second vehicle 20. As such, the second vehicle 20 which has received the travel plan can output the travel plan via the second output interface 26 or can automatically or manually travel on the basis of the travel plan. The server 30 may transmit a new travel plan to the second vehicle 20 in a case in which the new travel plan is generated even after the second vehicle 20 has started traveling on the basis of the travel plan.

As described above, an information processing apparatus which is the server 30 according to the present embodiment includes a controller which is the server controller 33. The controller acquires the first storage information indicating the stored amount of the first storage apparatus 11 of the first vehicle 10 including the first storage apparatus 11 which stores drainage water. The controller generates the travel plan for the second vehicle 20 including the second storage apparatus 21 which stores drainage water collected from the first vehicle 10, on the basis of the predetermined information including the first storage information. According to such a configuration, the information processing apparatus can generate the travel plan for the second vehicle 20 on the basis of the first storage information of the first vehicle 10. Therefore, the information processing apparatus can improve the utility techniques for generating a travel plan for a vehicle.

At an information processing apparatus which is the server 30 according to the present embodiment, a controller which is the server controller 33 can determine whether or not the stored amount of the first storage apparatus 11 reaches the first limit amount on the basis of the predetermined information in generation of the travel plan for the second vehicle 20. According to such a configuration, the information processing apparatus can generate the travel plan for the second vehicle 20 such that the second vehicle 20 collects the collection target from the first vehicle 10 before the stored amount of the first storage apparatus 11 reaches the first limit amount.

At an information processing apparatus which is the server 30 according to the present embodiment, in a case in which a controller which is the server controller 33 determines that the stored amount of the first storage apparatus 11 reaches the first limit amount at the first time point, the controller can generate the travel plan for the second vehicle 20 such that the second vehicle 20 reaches the first vehicle 10 by no later than the first time point. According to such a configuration, the information processing apparatus can generate the travel plan for the second vehicle 20 which improves fuel efficiency by reducing traveling speed of the second vehicle 20 in a range in which the stored amount of the first storage apparatus 11 does not reach the first limit amount. Alternatively, in a case in which there are a plurality of first vehicles 10, the information processing apparatus can generate the travel plan for the second vehicle 20 so as to collect a collection target from the first vehicle 10 while increasing priority as time points at which the stored amounts of the first storage apparatuses 11 reach the first limit amount are earlier. Therefore, the information processing apparatus can further improve utility of the technique of generating a travel plan for a vehicle.

At an information processing apparatus which is the server 30 according to the present embodiment, a controller which is the server controller 33 can acquire the second storage information indicating the stored amount of the second storage apparatus 21 of the second vehicle 20. The controller can determine whether or not the stored amount of the second storage apparatus 21 reaches the second limit amount in generation of the travel plan for the second vehicle 20. According to such a configuration, the information processing apparatus can prevent a situation in which the stored amount of the second storage apparatus 21 of the second vehicle 20 reaches the limit amount during collection of a collection target from the first vehicle 10.

At an information processing apparatus which is the server 30 according to the present embodiment, the predetermined information may include information regarding a collection facility such as a drainage treatment facility which collects drainage water from the second vehicle 20. A controller which is the server controller 33 can generate the travel plan for the second vehicle 20, which passes through the drainage treatment facility on the basis of the predetermined information. According to such a configuration, the information processing apparatus can generate the travel plan so as to discard the collection target at the collection facility before the stored amount of the second vehicle 20 reaches a limit and further continue collection of a collection target from the first vehicle 10.

The information processing system 1 according to the present embodiment includes an information processing apparatus which is the server 30 according to the present embodiment, the first vehicle 10 and the second vehicle 20. The first vehicle 10 transmits the first storage information to the information processing apparatus. The information processing apparatus transmits the travel plan to the second vehicle 20. According to such a configuration, the information processing system 1 can generate the travel plan for the second vehicle 20 on the basis of the first storage information of the first vehicle 10 and transmit the travel plan to the second vehicle 20. Therefore, the information processing system 1 can improve utility of the technique of generating a travel plan for a vehicle.

The information processing method according to the present embodiment is an information processing method to be executed by an information processing apparatus which is the server 30 according to the present embodiment. The information processing method includes a step of acquiring first storage information indicating a stored amount of the first storage apparatus 11 of the first vehicle 10 including the first storage apparatus 11 which stores drainage water, and a step of generating a travel plan for the second vehicle 20 including the second storage apparatus 21 which stores the drainage water collected from the first vehicle 10, on the basis of predetermined information including the first storage information. According to such a configuration, the information processing apparatus can generate the travel plan for the second vehicle 20 on the basis of the first storage information of the first vehicle 10. Therefore, the information processing apparatus can improve utility of the technique of generating a travel plan for a vehicle.

While the present disclosure has been described on the basis of the drawings and the examples, it is to be noted that a person skilled in the art can easily make various modifications and alterations on the basis of the present disclosure. It is to be, therefore, noted that these modifications and alterations are included in the scope of the present disclosure. For example, it is possible to rearrange functions, or the like, included in the respective means, the respective steps, or the like, without producing logical inconsistency, and it is possible to combine a plurality of means, steps, or the like, to make one means, step, or the like, or divide the means, steps, or the like.

For example, while, in the above-described embodiment, description has been provided assuming that the acquisition interface provided at the information processing apparatus is the server communication interface 31 provided at the server 30, the acquisition interface may acquire information using any suitable method. For example, the acquirer may include an input apparatus such as a touch panel, a camera and a microphone, which accepts input operation from a user. Alternatively, the acquisition interface may include a reading apparatus which reads information from a portable medium such as a USB memory and a DVD.

For example, in the above-described embodiment, all or part of functions or processing described as the functions or the processing of the server 30 may be realized as functions or processing of the first vehicle 10 or the second vehicle 20. Specifically, it is also possible to store a program which describes processing content for realizing respective functions of the server 30 according to the embodiment in the first memory 15 such as a memory of the first vehicle 10 and cause the first controller 16 such as a processor of the first vehicle 10 to read out and execute the program. In a similar manner, it is also possible to store a program which describes processing content for realizing respective functions of the server 30 according to the embodiment in the second memory 25 such as a memory of the second vehicle 20 and cause the second controller 27 such as a processor of the second vehicle 20 to read out and execute the program.

For example, it is also possible to employ a configuration in which a general-purpose information processing apparatus such as a smartphone and a computer is caused to function as the first vehicle 10, the second vehicle 20 or the server 30 according to the above-described embodiment. Specifically, a program which describes processing content for realizing respective functions of the first vehicle 10, or the like, according to the embodiment is stored in a memory of electronic equipment, and the program is read out and executed by a processor of the electronic equipment. Therefore, the invention according to the present embodiment can be realized as a program which can be executed by a processor. For example, in a case in which a general-purpose information processing apparatus is caused to function as the first vehicle 10, the invention according to the present embodiment can be realized by providing an information processing apparatus having the above-described configuration and functions as the configuration and the functions of the first vehicle 10, at the first vehicle 10.

The invention claimed is:

1. An information processing apparatus comprising:
a controller configured to:
acquire first storage information indicating a stored amount of a first storage apparatus of a first vehicle provided with a facility and the first storage apparatus, the facility including a toilet, a bathroom or a kitchen, and the first storage apparatus storing drainage water that has flowed out from the facility; and
generate a travel plan for a second vehicle configured to collect the drainage water from the first vehicle and provided with a second storage apparatus for storing the drainage water collected from the first vehicle, based on predetermined information which includes the first storage information and a location at which the first vehicle is stopped, the travel plan including a stop point at which the second vehicle is to stop for collecting the drainage water from the first vehicle, and a traveling route which passes through the stop point or which reaches the stop point.

2. The information processing apparatus according to claim 1,
wherein, in generation of the travel plan for the second vehicle, the controller is configured to determine whether the stored amount of the first storage apparatus will reach a first limit amount based on the predetermined information.

3. The information processing apparatus according to claim 2,
wherein, in a case in which the controller determines that the stored amount of the first storage apparatus will reach the first limit amount at a first time point, the controller includes into the travel plan for the second vehicle a scheduled time of arrival at the stop point that is not later than the first time point.

4. The information processing apparatus according to claim 1,
wherein the controller is configured to:
acquire second storage information indicating a stored amount of the second storage apparatus of the second vehicle; and
in generation of the travel plan for the second vehicle, determine whether the stored amount of the second storage apparatus will reach a second limit amount.

5. The information processing apparatus according to claim 4,
wherein the predetermined information includes information regarding a drainage treatment facility which is capable of collecting the drainage water from the second vehicle, and
in a case in which the controller determines that the stored amount of the second storage apparatus will reach the second limit amount, the controller includes into the travel plan for the second vehicle, as the traveling route, a route to pass through the drainage treatment facility based on the predetermined information.

6. The information processing apparatus according to claim 1,
wherein the information processing apparatus is a server which can communicate with the first vehicle and the second vehicle via a network.

7. An information processing system comprising:
the information processing apparatus according to claim 1;
the first vehicle; and
the second vehicle,
wherein the first vehicle is configured to transmit the first storage information to the information processing apparatus, and
the information processing apparatus is configured to transmit the travel plan to the second vehicle.

8. A vehicle comprising the information processing apparatus according to claim 1,
wherein the vehicle is the first vehicle.

9. A vehicle comprising the information processing apparatus according to claim 1,
wherein the vehicle is the second vehicle.

10. An information processing method to be executed by an information processing apparatus, the information processing method comprising:
acquiring first storage information indicating a stored amount of a first storage apparatus of a first vehicle provided with a facility and the first storage apparatus, the facility including a toilet, a bathroom, or a kitchen, and the first storage apparatus storing drainage water that has flowed out from the facility; and
generating a travel plan for a second vehicle configured to collect the drainage water from the first vehicle and provided with a second storage apparatus for storing the drainage water collected from the first vehicle, based on predetermined information which includes the first storage information and a location at which the first vehicle is stopped, the travel plan including a stop point at which the second vehicle is to stop for collecting the drainage water from the first vehicle, and a traveling route which passes through the stop point or which reaches the stop point.

11. The information processing method according to claim 10, wherein, in generation of the travel plan for the second vehicle, it is determined whether the stored amount of the first storage apparatus will reach a first limit amount based on the predetermined information.

12. The information processing method according to claim 11,
wherein, in a case in which it is determined that the stored amount of the first storage apparatus will reach the first limit amount at a first time point, the travel plan for the second vehicle further includes a scheduled time of arrival at the stop point that is not later than the first time point.

13. The information processing method according to claim 10, further comprising
acquiring second storage information indicating a stored amount of the second storage apparatus of the second vehicle,
wherein, in generation of the travel plan for the second vehicle, it is determined whether the stored amount of the second storage apparatus will reach a second limit amount.

14. The information processing method according to claim 13,
wherein the predetermined information includes information regarding a drainage treatment facility which is capable of collecting the drainage water from the second vehicle, and
in a case in which it is determined that the stored amount of the second storage apparatus will reach the second limit amount, the travel plan for the second vehicle includes, as the traveling route, a route to pass through the drainage treatment facility based on the predetermined information.

15. The information processing method according to claim 10,
wherein the first vehicle transmits the first storage information to the information processing apparatus, and
the information processing apparatus transmits the travel plan to the second vehicle.

16. A non-transitory computer-readable medium storing an information processing program which, when executed by a computer, causes the computer to execute an information processing method according to claim 10.

* * * * *